(12) United States Patent
Saito

(10) Patent No.: US 8,908,934 B2
(45) Date of Patent: Dec. 9, 2014

(54) FINGERPRINT RECOGNITION FOR LOW COMPUTING POWER APPLICATIONS

(75) Inventor: Tamio Saito, San Jose, CA (US)

(73) Assignee: IVI Holdings Ltd., Boulder, CO (US)

( * ) Notice: Subject to any disclaimer, the term of this patent is extended or adjusted under 35 U.S.C. 154(b) by 0 days.

(21) Appl. No.: 12/048,162

(22) Filed: Mar. 13, 2008

(65) Prior Publication Data

US 2010/0215224 A1     Aug. 26, 2010

Related U.S. Application Data

(60) Provisional application No. 60/894,895, filed on Mar. 14, 2007.

(51) Int. Cl.
G06K 9/00     (2006.01)

(52) U.S. Cl.
CPC ........ G06K 9/00067 (2013.01); G06K 9/00093 (2013.01)
USPC ....................................................... 382/124

(58) Field of Classification Search
CPC .............................. G06T 9/20; G06K 9/00067
USPC .................................................. 382/124, 243
See application file for complete search history.

(56) References Cited

U.S. PATENT DOCUMENTS

| | | | | |
|---|---|---|---|---|
| 5,659,626 A | * | 8/1997 | Ort et al. | 382/125 |
| 5,920,641 A | * | 7/1999 | Ueberreiter et al. | 382/125 |
| 7,327,596 B2 | * | 2/2008 | Ebihara et al. | 365/149 |
| 2006/0104484 A1 | * | 5/2006 | Bolle et al. | 382/115 |

OTHER PUBLICATIONS

Jie et al., Fingerprint minutiae matching algorithm for real time system [on-line], Jan. 2006 [retrieved on Sep. 10, 2014], Pattern Recognition, vol. 39, Issue 1, pp. 143-146. Retrieved from the Internet: http://www.sciencedirect.com/science/article/pii/S003132030500302X.*

Jain et al., Filterbank-Based Fingerprint Matching [on-line], May 2000 [retrieved Sep. 10, 2014], IEEE Transactions on Image Processing, vol. 9, No. 5, pp. 846-859. Retrieved from the Internet: http://ieeexplore.ieee.org/xpls/abs_all.jsp?arnumber=841531&tag=1.*

Ratha et al., Adaptive Flow Orientation-Based Feature Extraction in Fingerprint Images [on-line], Nov. 1995 [retrieved on Sep. 10, 2014], Pattern Recognition, vol. 28, Issue 11, pp. 1657-1672. Retrieved from the Internet: http://www.sciencedirect.com/science/article/pii/0031320395000393.*

* cited by examiner

*Primary Examiner* — Matthew Bella
*Assistant Examiner* — Dennis Rosario
(74) *Attorney, Agent, or Firm* — Marsh Fischmann & Breyfogle LLP; Daniel J. Sherwinter

(57) ABSTRACT

A method and apparatus are provided for improved fingerprint recognition. A fingerprint image associated with an authorized user can be captured with a sensor. Direction vectors for a plurality of pixels of the first fingerprint image are then calculated. Next, characteristic points of the fingerprint image are located in a first coordinate system. The fingerprint central nucleus is determined based on the calculated direction vectors, and is expressed in the first coordinate system. Subsequently, a second coordinate system having an origin located relative to the fingerprint central nucleus is determined. Thereafter, the characteristic points of the fingerprint image are mapped to the second coordinate system. Finally, the fingerprint central nucleus and fingerprint characteristic points expressed in the second coordinate system are saved as a fingerprint template.

18 Claims, 4 Drawing Sheets

FINGERPRINT RECOGNITION FOR LOW COMPUTING POWER APPLICATIONS

CROSS-REFERENCE TO RELATED APPLICATIONS

The instant nonprovisional patent application claims priority to Provisional Application No. 60/894,895 filed Mar. 14, 2007 and which is incorporated by reference in its entirety herein for all purposes.

BACKGROUND OF THE INVENTION

Embodiments of the present invention relate to fingerprint matching, and more particularly, to a method and apparatus for using a shape function for fingerprint recognition.

Fingerprint identification is being more commonly used as way for authenticating a user in electronic transactions. As opposed to security passwords, one's fingerprint is highly unique to a particular individual and does not require memorization. Every fingerprint consists of unique patterns that are aggregate characteristics of ridges and minutia points.

Generally, fingerprint recognition involves automatically verifying a match between two fingerprints. In particular, matching algorithms have been used to compare recently scanned fingerprints with a previously stored fingerprint template. In a typical matching algorithm, the fingerprint of an authorized user is initially captured and processed; with the result stored as a fingerprint template. When subsequent access is requested, a fingerprint image is again captured and processed, but this time the result is compared with the stored fingerprint template. A match authenticates the user and allows the user to proceed with an operation, while a mismatch blocks further access.

However, the captured fingerprint, even of the same finger, often will vary from time to time, based on finger size, finger position, etc., and therefore an exact match is not always available. Accordingly, alternative matching techniques and algorithms have been developed.

U.S. Patent Publication No. 2007/0230751 discloses a method for correcting distortion caused by fingerprint input sensors. In this reference, control lines for the distortion caused by an image sensor are designed. Next, an average of the vertical and horizontal resolutions of a fingerprint image is obtained. Based on a ratio of these averages, the control lines are modeled in order compensate for the distortion of the acquired image. Though this algorithm is effective at removing sensor image distortion, the stored fingerprint template and the scanned image can still vary for a specific individual based on finger position and finger size.

U.S. Patent Publication No. 2007/0253608 discloses a fingerprint matching algorithm using hash functions. As described in this reference, a set of proximate minutia points are determined from minutia points of a captured fingerprint image. The set of proximate minutia points are then subjected to a hash function in order to obtain hash values used for subsequent fingerprint matching. An advantage of this algorithm is the normalization scanned fingerprint images. However, a disadvantage of this system is that multiple sets of minutia points must be determined and transformed for normalization, resulting in increased programming code size and processing time. As a result, implementation of such a configuration on an integrated circuit (IC) card, which requires small code size, would be exceedingly difficult.

Accordingly, there is a need in the art for an efficient and simple fingerprint matching algorithm that is effective for any individual and any fingerprint. Moreover, the fingerprint matching method and system should be configured to have a small code size and capable of implementation on an IC card.

BRIEF SUMMARY OF THE INVENTION

Embodiments of the present invention disclose a system and method for matching fingerprints. In accordance with one embodiment, a fingerprint image associated with an authorized user is captured with a sensor. Direction vectors for a plurality of pixels of the first fingerprint image are then calculated. Next, characteristic points of the fingerprint image are located in a first coordinate system. The fingerprint central nucleus is determined based on the calculated direction vectors, and is expressed in the first coordinate system. Subsequently, a second coordinate system having an origin located relative to the fingerprint central nucleus is determined. Thereafter, the characteristic points of the fingerprint image are mapped to the second coordinate system. Finally, the fingerprint central nucleus and fingerprint characteristic points expressed in the second coordinate system are saved as a fingerprint template.

In another exemplary embodiment, a second fingerprint image associated with a user is captured by the sensor. Direction vectors are calculated, and characteristic points for the second fingerprint image are located in the first coordinate system. A fingerprint central nucleus of the second fingerprint image is determined based on the calculated direction vectors and expressed in the first coordinate system. The characteristic points and the fingerprint central nucleus of the second fingerprint image are then mapped to the second coordinate system used to store the fingerprint template. Lastly, a user is authenticated based on a comparison match between the characteristic points and fingerprint central nucleus of the second fingerprint image (as expressed in the second coordinate system) with the stored fingerprint template.

The following detailed description together with the accompanying drawings will provide a better understanding of the nature and advantages of the present invention.

DETAILED DESCRIPTION OF THE INVENTION

A method and apparatus for using shape functions for fingerprint recognition is disclosed. The following description is provided to enable any person skilled in the art to make and use the invention and sets forth the best modes contemplated by the inventor for carrying out the invention. Various modifications will remain readily apparent to those skilled in the art. Any and all such modifications, equivalents and alternatives are intended to fall within the spirit and scope of the present invention.

Figure 1:
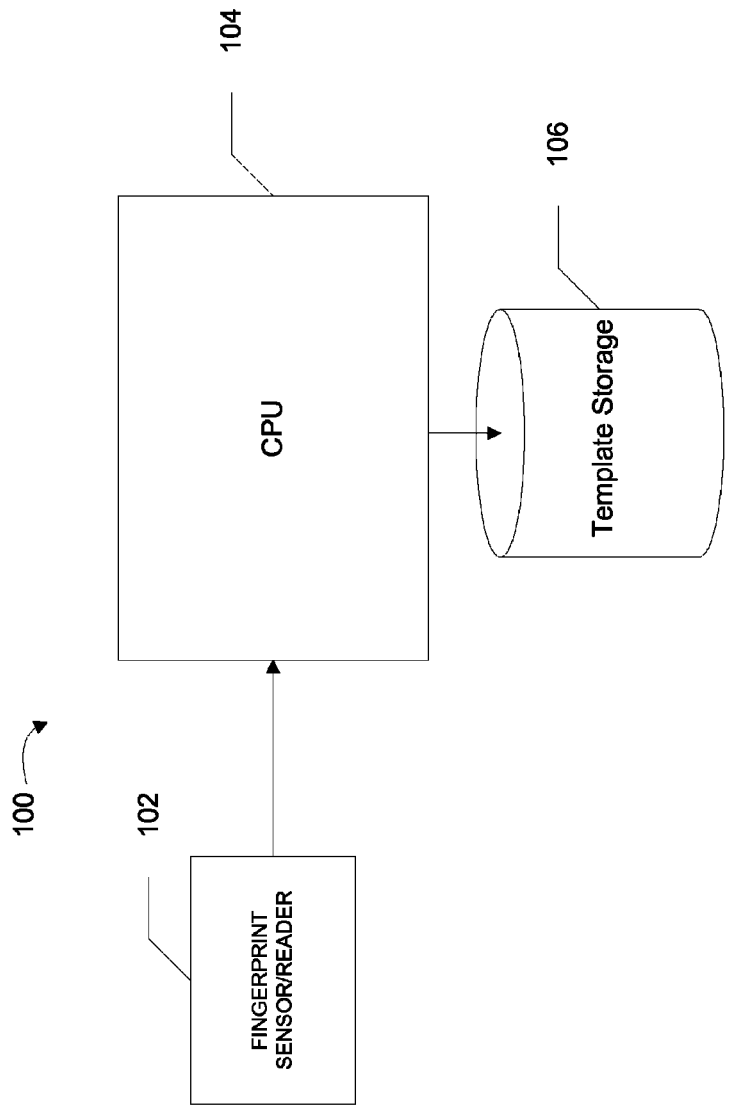
FIG. 1 is a simplified block diagram illustrating an overall configuration of the system according to an embodiment of the present invention.

FIG. 1 is a simplified block diagram illustrating an overall configuration of the system according to an embodiment of the present invention. The system 100 includes a fingerprint sensor 102, a central processing unit 104, and a temporary storage unit 106. In one embodiment, the sensor 102, central processing unit 104, and temporary storage unit 106 are implemented together on an IC card. Alternatively, the system 100 can be implemented with stand alone components.

In one embodiment, fingerprint sensor 102 is a biometric sensor configured to read a fingerprint. When a user places their finger on the sensor, an image of the fingerprint is captured and sent to the processing unit 102. Alternatively, the fingerprint sensor can be an optical, semiconductor, or ultrasound sensor.

Processing unit 104 is configured to process the fingerprint data received from the fingerprint sensor. In one embodiment, the processing unit 104 is configured to locate characteristic points and a central nucleus of the captured fingerprint image in a first coordinate system, and then map the characteristic points and central nucleus to a second coordinate system. In addition, the processing unit 104 is configured to perform fingerprint matching based on comparison of a captured fingerprint image with a stored fingerprint template. A detailed description of this process will be described below.

According to one embodiment of the present invention, temporary storage unit 106 is database for storing data. In an exemplary embodiment, temporary storage unit 106 stores fingerprint templates determined by processing unit 104.

Figure 2:
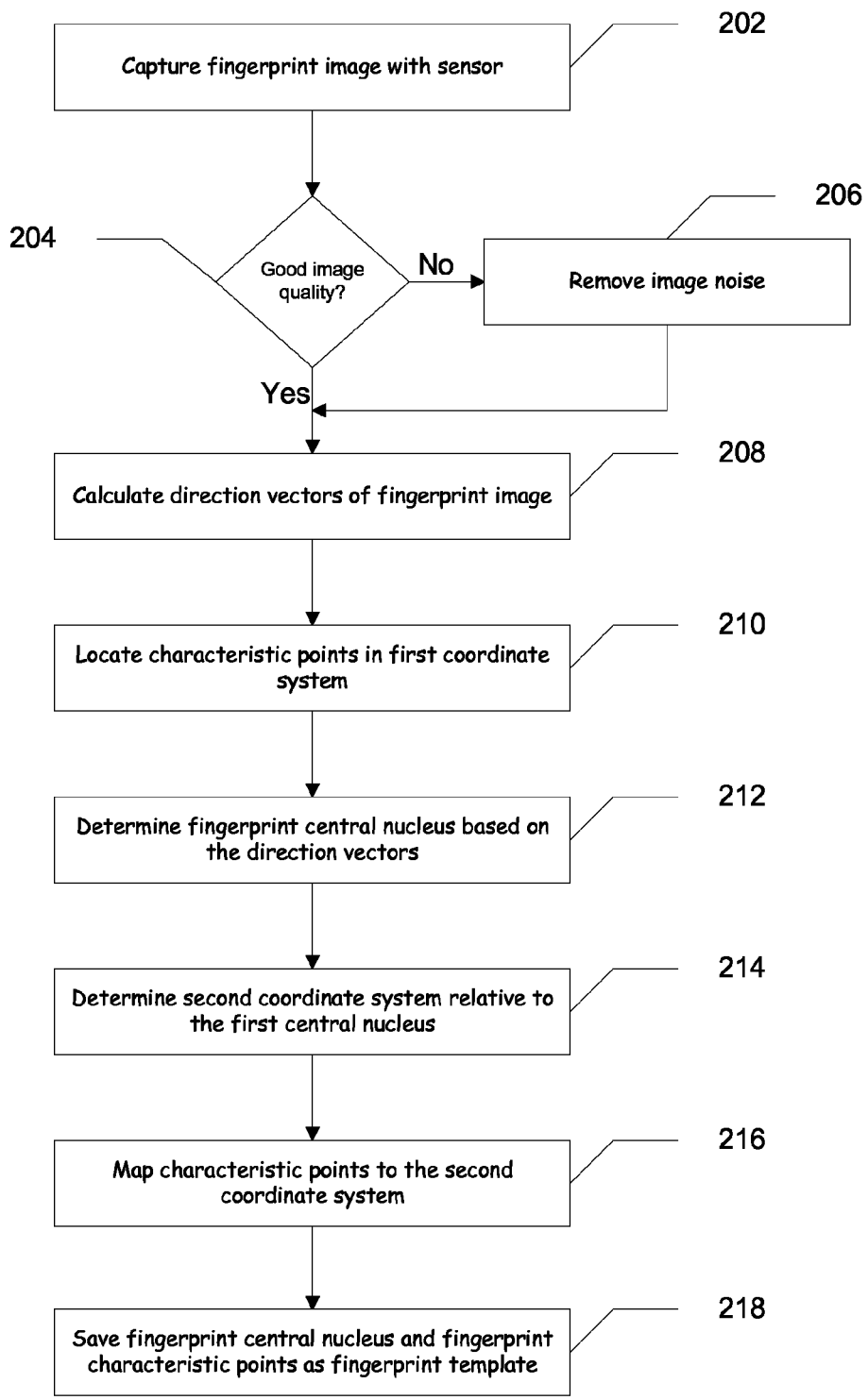
FIG. 2 is a flowchart illustrating a method for storing a fingerprint template according to an embodiment of the present invention.

FIG. 2 is a flowchart illustrating a method for storing a fingerprint template according to an embodiment of the present invention. In step 202, a fingerprint image is captured by the fingerprint sensor. In the initialization stage, the first fingerprint image is the image of a user authorized to access information. In an IC card implementation, the authorized user is the card holder.

Following step 202, in step 204, the processing unit automatically checks the image quality of the scanned fingerprint image. If the processor determines that the image quality is poor, then in step 206 noise and like artifacts are removed from the fingerprint image. If the processor determines that the image quality is of good quality, then the processing unit proceeds to step 208. By automatic applying noise reduction to the fingerprint image prior to mapping, a small programming code size can be maintained. This is advantageous over conventional methods where substantial image enhancement is executed prior to matching, thereby increasing code size.

In step 208, the processing unit calculates direction vectors for each pixel of the fingerprint image. In one embodiment, the direction vectors are calculated based on the gradient intensity of adjacent pixels. A comparison of the gradient intensity of adjacent pixels indicates the direction of a particular pixel vector. In general, the method of determining direction vectors of an image is well known in the art and the detailed description of which will be omitted.

In step 210, characteristic points, or minutiae, of the fingerprint image are located in a simple coordinate system such as a Cartesian coordinate system. In one embodiment, the characteristics points are points mapped to a simple system of (x, y) coordinates. Next, in step 212 a central nucleus of the fingerprint image is determined based on the calculated direction vectors. Specifically, the direction vectors are analyzed to determine the minimum radius of curvature. The fingerprint central nucleus is then determined as the center point of adjacent pixels having the minimum radius of curvature.

Following step 212, in step 214, a second coordinate system is determined based on the fingerprint central nucleus. In an exemplary embodiment, the second coordinate system is a polar coordinate system and points represented in the plane are given by an angle and distance from the origin (radius) relative to the fingerprint central nucleus. In an alternate embodiment, the second coordinate system is a three dimensional coordinate system with the pixel gradient intensity serving as a third coordinate. Moreover, fourth and fifth dimensions can be added based on the angle of the pixel and gradient color, respectively. The second coordinate system may instead be a spherical or cylindrical coordinate system. Based on the coordinate system utilized, the characteristic points of the fingerprint image expressed in the first coordinate system are then mapped to the second coordinate system in step 216. The mapping algorithm for performing this step will be described in detail below. Finally, in step 218, the characteristic points and the fingerprint central nucleus expressed in the second coordinate system are then saved as a fingerprint template in the database. In an exemplary embodiment, the fingerprint template is associated with a primary user authorized to use the IC card.

Figure 3:
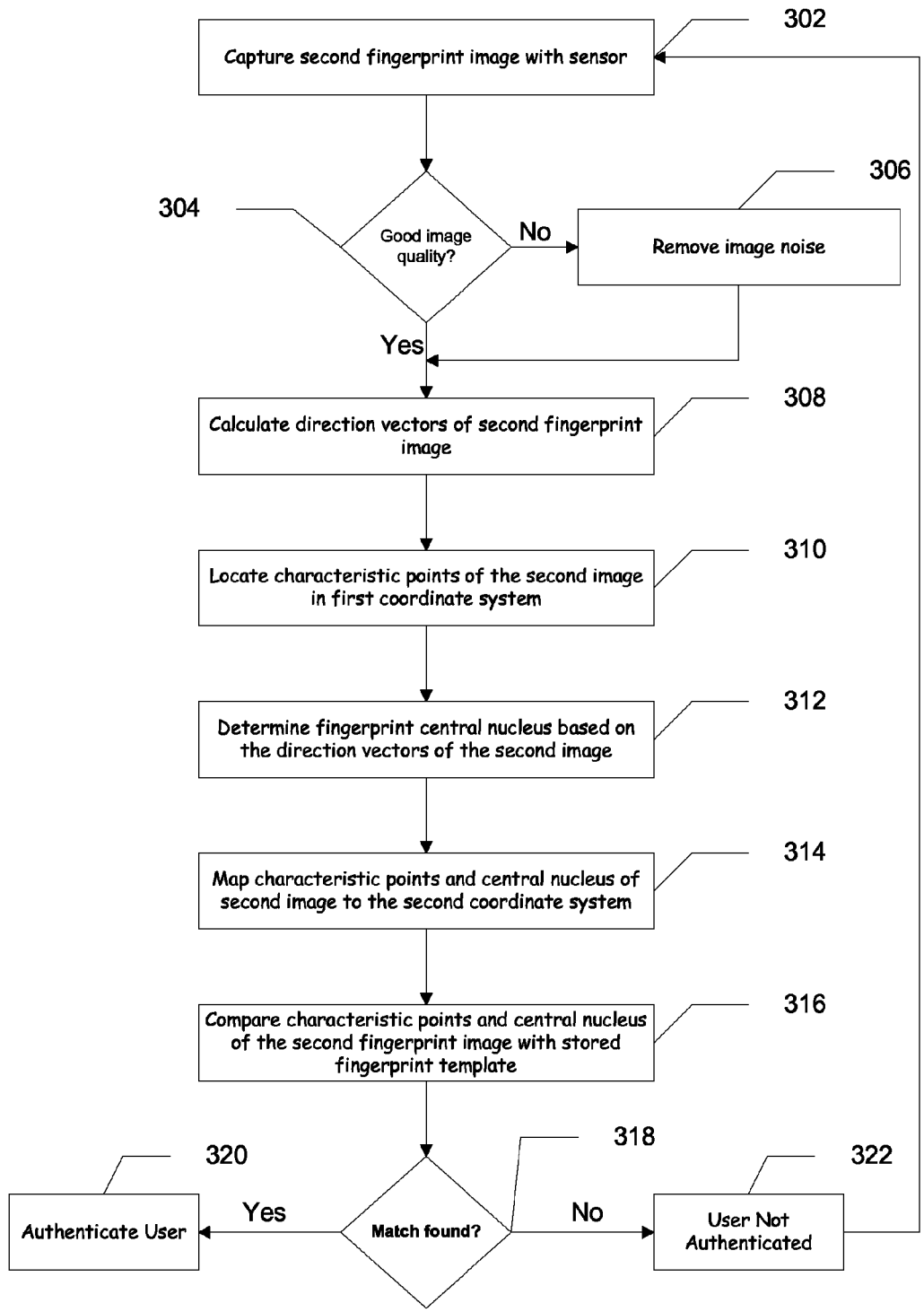
FIG. 3 is a flowchart illustrating a method for fingerprint matching according to an embodiment of the present invention.

FIG. 3 is a flowchart illustrating a method for fingerprint matching according to an embodiment of the present invention. After a fingerprint template has been saved as described above, fingerprint recognition can be accomplished as follows. In step 302, a second fingerprint image is captured by the fingerprint sensor. The quality of the image is determined in step 304, and if the quality is poor, noise and other artifacts can be automatically removed in step 306. Next, in step 308, direction vectors are calculated for each pixel of the second fingerprint image as described above. In step 310, characteristic points of the second fingerprint image are located in the first coordinate system, i.e., a Cartesian coordinate system. Following step 310, in step 312 the fingerprint central nucleus of the second fingerprint image is determined based upon the calculated direction vectors.

After locating the characteristic points and central nucleus of the second fingerprint image, in step 314 these points are then mapped to the second coordinate system associated with the fingerprint template. Next, in step 316 the characteristic points and the central nucleus of the second fingerprint image are then compared with the characteristic points and central nucleus of the stored fingerprint template. If a match is determined between the transformed second fingerprint image and the fingerprint template in step 318, then in step 320 the user is authenticated and granted operation access. On the other hand, if a match is not determined in step 318, then in step 322 the user authentication fails and the program resets.

Fingerprint Matching Algorithm

Figure 4:
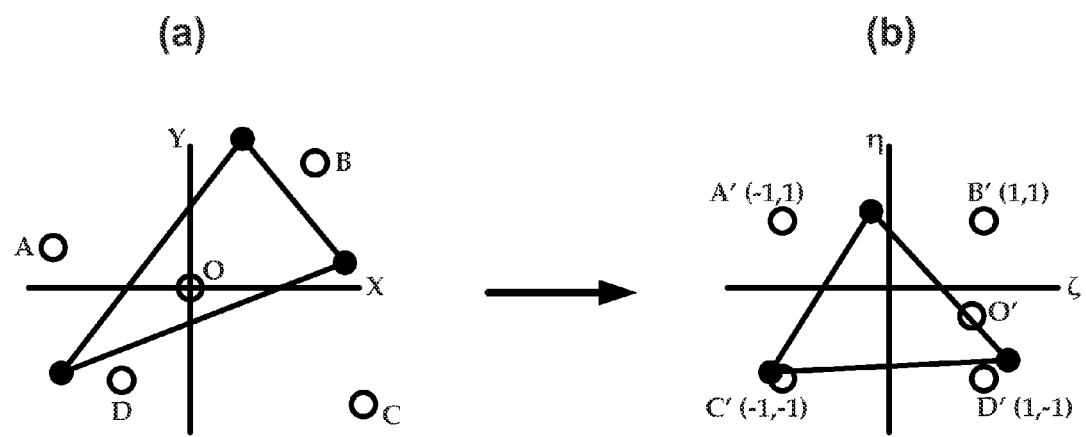
FIGS. 4(a) and 4(b) are simplified graphs illustrating an example of the fingerprint matching algorithm according to an embodiment of the present invention.

FIGS. 4(*a*) and 4(*b*) are simplified graphs illustrating an example of the fingerprint matching algorithm according to an embodiment of the present invention. As shown FIG. 4(*a*), the fingerprint central nucleus is made the coordinate origin (O). The four closest characteristic points (A, B, C, D) from the fingerprint central nucleus are located. FIG. 4(*b*) shows the four characteristic points mapped to a second coordinate system. As shown in this figure, the four characteristic points map so as to become a square. After mapping, the position of the fingerprint central nucleus in the center of the square is automatically calculated. In one embodiment, fingerprint recognition is carried out by the position in which the central nucleus exists in this square.

More particularly, the four characteristic point coordinates can be expressed as $(X_i, Y_i)$ for $i=1, 2, 3, 4$; the fingerprint central nucleus can be expressed as $(X, Y)$; and the mapping function is regarded as $\emptyset_i = 1, 2, 3, 4$. Because the characteristic points are mapped to a simple square as shown in FIG. 4(*b*), the fingerprint central nucleus can be represented by the following two equations:

$$X = \Sigma(X_i \times \emptyset_i) \tag{Equation 1}$$

$$Y = \Sigma(Y_i \times \emptyset_i) \tag{Equation 2}$$

Moreover, Ø may be determined as follows:

$$Ø_1 = 0.25 \times (1-\xi) \times (1\cdot\eta) \quad \text{(Equation 3)}$$

$$Ø_2 = 0.25 \times (1+\xi) \times (1-\eta) \quad \text{(Equation 4)}$$

$$Ø_3 = 0.25 \times (1\cdot\xi) \times (1\cdot\eta) \quad \text{(Equation 5)}$$

$$Ø_4 = 0.25 \times (1\cdot\xi) \times (1+\eta) \quad \text{(Equation 6)}$$

Equations 1 and 2 are solved for ξ, η, and the resulting solutions for (α, β) become the coordinates of the fingerprint central nucleus in the second coordinate system as shown in FIG. 4(b). Solving equations 1 and 2 for (ξ, η) makes the equation nonlinear, and solving by an explicit method in terms of numerical analysis cannot be done. However, as long as the fingerprint central nucleus and the characteristic points exist on the same space, reliably obtaining a convergence solution by an implicit solution method is possible. As such, fingerprint recognition according to embodiments of the present invention is conveniently obtained by determining where the fingerprint central nucleus exists on this simple square.

Further embodiments can be envisioned to one of ordinary skill in the art after reading this disclosure. In other embodiments, combinations or sub-combinations of the above disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

What is claimed is:

1. A method for fingerprint recognition, comprising:
capturing a first fingerprint image with a sensor;
calculating direction vectors for a plurality of pixels of the first fingerprint image;
locating characteristic points of the first fingerprint image in a first coordinate system;
determining that a fingerprint central nucleus of the first fingerprint image is a center point of adjacent pixels by calculating a minimum radius from a plurality of radii of curvature based on the direction vectors, the adjacent pixels being adjacent to the minimum radius,
wherein the fingerprint central nucleus is expressed in the first coordinate system;
determining a second coordinate system so that its origin is located relative to the fingerprint central nucleus of the first fingerprint image;
mapping the characteristic points of the first fingerprint image to the second coordinate system; and
saving the fingerprint central nucleus and fingerprint characteristic points of the first fingerprint image expressed in the second coordinate system as a fingerprint template.

2. The method of claim 1, wherein the first fingerprint image is associated with an authorized user.

3. The method of claim 1, wherein the sensor is a biometric sensor configured to read a fingerprint of a user.

4. The method of claim 1, wherein after capturing the fingerprint image with the sensor, the quality of the fingerprint image is checked, and, if the quality is poor, image noise is automatically removed.

5. The method of claim 1, wherein the second coordinate system is a polar coordinate system representing an angle and a distance from its origin relative to the fingerprint central nucleus.

6. The method of claim 1, further comprising:
capturing a second fingerprint image with a sensor;
calculating direction vectors for a plurality of pixels of the second fingerprint image;
locating characteristic points of the second fingerprint image in the first coordinate system;
determining a fingerprint central nucleus of the second fingerprint image based on the direction vectors of the second fingerprint image, wherein the fingerprint central nucleus of the second fingerprint image is expressed in the first coordinate system;
mapping the characteristic points and the fingerprint central nucleus of the second fingerprint image to the second coordinate system; and
comparing the characteristic points and the fingerprint central nucleus of the second fingerprint image to the stored fingerprint template.

7. The method of claim 6, wherein a fingerprint match is determined if the characteristic points and the fingerprint central nucleus of the second fingerprint image match the stored fingerprint template.

8. The method of claim 1, wherein the second coordinate system is a multi-dimensional coordinate system having at least three dimensions.

9. The method of claim 8, wherein one of the at least three dimensions indicates a pixel gradient intensity.

10. A system for fingerprint recognition, the system comprising:
a fingerprint sensor configured to capture a first fingerprint image;
a processor configured to:
(a) calculate direction vectors for a plurality of pixels of the first fingerprint image;
(b) locate characteristic points of the first fingerprint image in a first coordinate system;
(c) determine that a fingerprint central nucleus is a center point of adjacent pixels by calculating a minimum radius from a plurality of radii of curvature based on the direction vectors the adjacent pixels being adjacent to the minimum radius;
wherein the fingerprint central nucleus is expressed in the first coordinate system;
(d) determine a second coordinate system whose so that its origin is located relative to the first central nucleus; and
(e) map the characteristic points to the second coordinate system; and a
temporary storage unit for storing a fingerprint template, wherein the fingerprint template comprises the fingerprint central nucleus and fingerprint characteristic points of the first fingerprint image expressed in the second coordinate system.

11. The system of claim 10 wherein the first fingerprint image is associated with an authorized user.

12. The system of claim 10 wherein the sensor is a biometric sensor configured to read a fingerprint of a user.

13. The system of claim 10 wherein the processor is configured to check the quality of the fingerprint image, and if the quality is poor, image noise is automatically removed.

14. The system of claim 10 wherein the sensor, the processing unit, and the temporary storage unit are implemented on an IC card.

15. The system of claim 10 wherein the first coordinate system is a Cartesian coordinate system.

16. The system of claim 10 wherein the second coordinate system is a polar coordinate system, a three dimensional coordinate system, a spherical coordinate system, or a cylindrical coordinate system.

17. The system of claim 10 wherein the processor is further configured to:
- calculate direction vectors for a plurality of pixels of a second fingerprint image;
- locate characteristic points of the second fingerprint image in the first coordinate system;
- determine a fingerprint central nucleus of the second fingerprint image based on the direction vectors of the second fingerprint image, wherein the fingerprint central nucleus of the second fingerprint image is expressed in the first coordinate system;
- map the characteristic points and the fingerprint central nucleus of the second fingerprint image to the second coordinate system; and
- compare the characteristic points and the fingerprint central nucleus of the second fingerprint image to the fingerprint template stored in the temporary storage unit.

18. A method for fingerprint recognition, comprising:
capturing a first fingerprint image with a sensor;
calculating direction vectors for a plurality of pixels of the first fingerprint image;
locating characteristic points of the first fingerprint image in a first coordinate system;
determining that a fingerprint central nucleus is a center point of adjacent pixels by calculating a minimum radius from a plurality of radii of curvature based on the direction vectors, the adjacent pixels being adjacent to the minimum radius;
wherein the fingerprint central nucleus is expressed in the first coordinate system;
determining a second coordinate system whose so that its origin is located relative to the first central nucleus;
mapping the characteristic points of the first fingerprint image to the second coordinate system;
saving the fingerprint central nucleus and fingerprint characteristic points of the first fingerprint image expressed in the second coordinate system as fingerprint template information;
capturing a second fingerprint image with a sensor;
calculating direction vectors for a plurality of pixels of the second fingerprint image;
locating characteristic points of the second fingerprint image in the first coordinate system;
determining a fingerprint central nucleus of the second fingerprint image based on the direction vectors of the second fingerprint image;
wherein the fingerprint central nucleus of the second fingerprint image is expressed in the first coordinate system;
mapping the characteristic points and the fingerprint central nucleus of the second fingerprint image to the second coordinate system; and
comparing the characteristic points and the fingerprint central nucleus of the second fingerprint image to the stored fingerprint template information.

* * * * *